May 27, 1952          J. F. SWIFT          2,598,620
HYDRAULIC TORQUE TRANSMITTING DEVICE
Filed Feb. 21, 1947
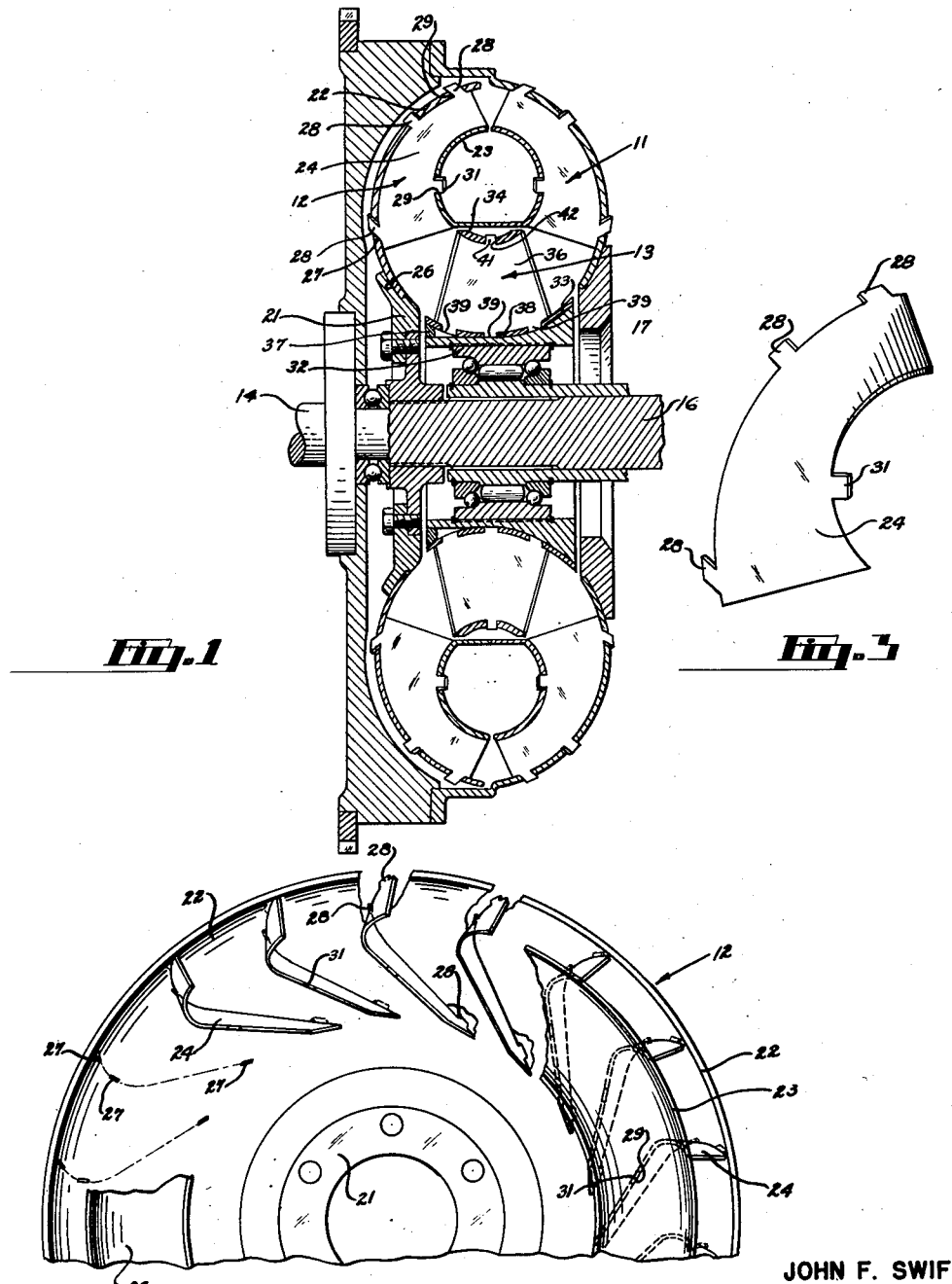
JOHN F. SWIFT
*INVENTOR.*
ATTORNEYS.

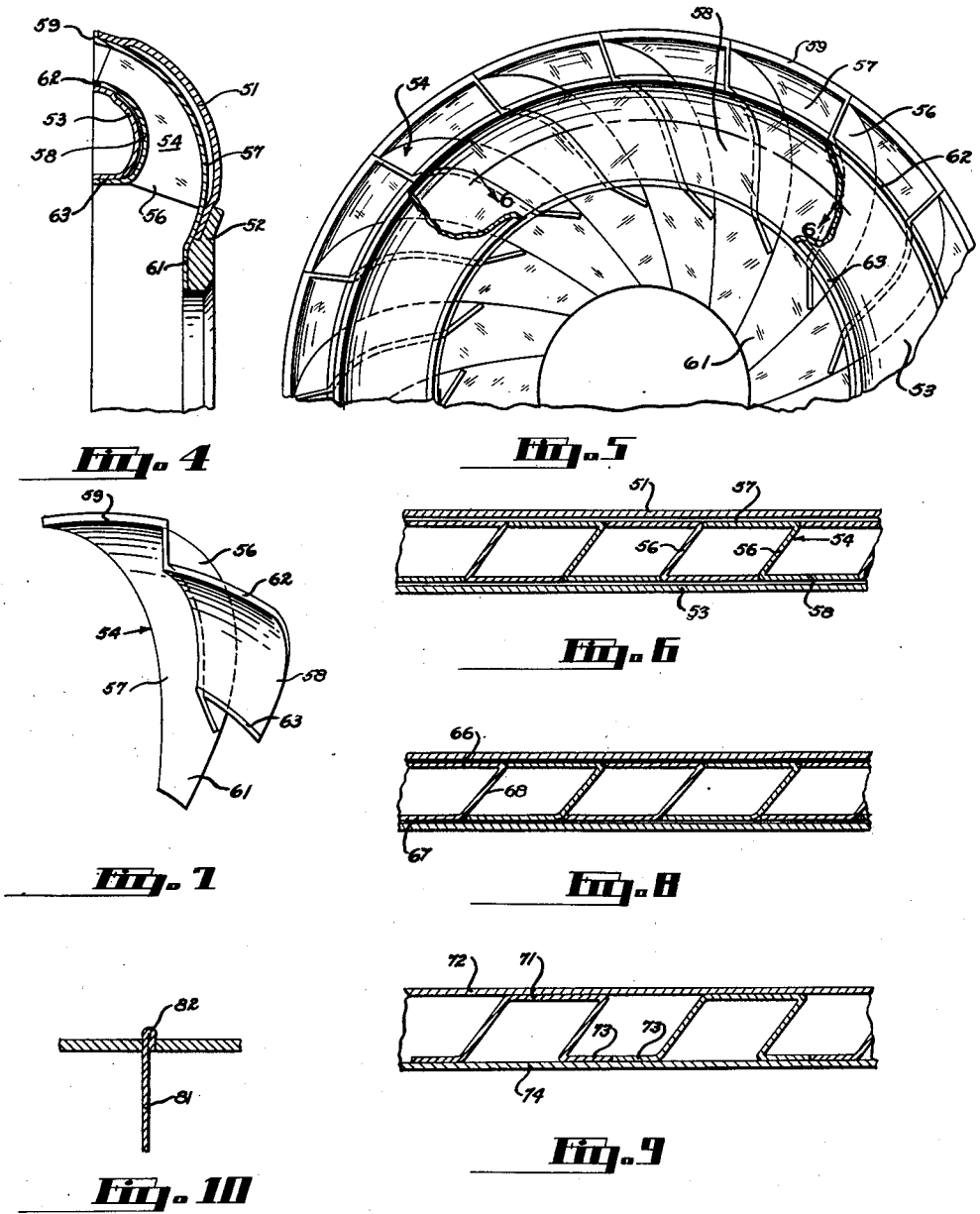

Patented May 27, 1952

2,598,620

UNITED STATES PATENT OFFICE 2,598,620

HYDRAULIC TORQUE TRANSMITTING DEVICE

John F. Swift, Ypsilanti, Mich., assignor to Ford Motor Company, Dearborn, Mich., a corporation of Delaware Application February 21, 1947, Serial No. 730,124

5 Claims. (Cl. 103—115)

This invention relates generally to hydraulic torque transmitting devices, and has particular reference to devices of this character which are formed principally from sheet metal.

Hydraulic torque transmitting devices such as fluid couplings and torque converters have in the past been formed both of castings and of sheet metal assemblies. It has been found extremely difficult to cast torque converter elements by production methods and still obtain the required blade contour and finish. Various types of sheet metal designs have also been tried, but here too it has been found difficult to form and assemble the complexly contoured blades and the supporting shrouds in a manner feasible for high-volume production without sacrificing the operating efficiency of the unit. Applicant's invention is therefore directed primarily to the provision of sheet metal torque converters and fluid couplings which lend themselves to relatively simple fabrication and assembly so as to be suitable for mass production, and which in addition are capable of attaining the requisite efficiency and operating performance characteristics.

In one form of the invention, each element of the hydraulic torque transmitting device includes inner and outer sheet metal shrouds, each provided with slots, together with a series of sheet metal blades or vanes formed with projecting tabs adapted to be inserted through the slots in the shrouds, after which the entire assembly is hydrogen brazed to form a unit. While it is appreciated that co-operating tabs and slots have heretofore been proposed for assembling spaced metal blades to supporting members of hydraulic torque transmitting devices, these constructions have relied upon peening over the ends of the tabs to complete the assembly and in addition have been of such construction that considerable clearance is required in the slots for the insertion of the tabs during the assembly operation. Applicant's invention on the other hand, does not require that the tab be crimped or peened over, and furthermore is of such design that the slots and the tabs can be close fitting within narrow limits or tolerances without impeding the assembly operation. A properly fitting assembly is thus obtained which not only permits smoother fluid flow, but also is considerably stronger and lends itself to hydrogen brazing because of the close fit.

In other forms of the invention the blades are individually formed of sheet metal stampings provided with flanges which may be suitably secured as by spot-welding to inner and outer sheet metal shrouds. The blade may be of various shapes, but as Z or U-shaped, with the adjacent flanges of the blades in abutting relation so that smooth self-contained fluid passages are provided between the blade for promoting smoother fluid flow and greater efficiency. The provision of separate sheet metal shrouds to which the flanges of the blades are secured results in an extremely rigid and strong assembly and permits the use of thinner material in the blades themselves. Also among the objects of the invention are to eliminate so far as possible exposed edges of sheet metal parts which might interfere with the fluid flow and cause turbulence.

Other objects and advantages of the invention will be made more apparent as this description proceeds, particularly when considered in connection with the accompanying drawings, in which:

Figure 1 is a cross sectional view of a torque converter embodying the present invention.

Figure 2 is an elevational view of the turbine of the torque converter shown in Figure 1, looking from the inside, and with the inner shroud partly broken away and several of the blades removed.

Figure 3 is a perspective view of one of the sheet metal blades of the turbine shown in Figures 1 and 2.

Figure 4 is a cross sectional view of the pump element of a modified torque converter.

Figure 5 is a fragmentary inside elevation of the pump shown in Figure 4.

Figure 6 is a cross sectional view taken substantially on the plane indicated by the line 6—6 of Figure 5.

Figure 7 is a perspective view of a single blade of the construction shown in Figures 4, 5 and 6.

Figures 8 and 9 are cross sectional views similar to Figure 6, but illustrating modified blade sections.

Figure 10 is a fragmentary cross sectional view illustrating a modified tab construction.

Although the present invention is applicable to fluid couplings, torque converters, and other types of hydraulic torque transmitting devices, for the purposes of illustration the invention is shown as embodied in a hydraulic torque converter of the type suitable for automotive use. As shown in the drawings, and particularly in Figures 1 to 3 inclusive, the torque converter comprises the usual three vaned elements, namely, pump 11, turbine 12, and reaction member 13. The pump 11 is connected to a driving shaft 14, and the turbine 12 is connected to a driven shaft 16 to supply torque to the latter. The reaction member 13 is connected through an overrunning clutch 17 to a sleeve 18 which is connected to the stationary transmission housing (not shown).

As is well-known, the blades of the pump, turbine, and reaction elements of the torque converter must of necessity be of complex three dimensional curvature to secure the proper operating characteristics and the requisite efficiency. It is this complex blade contour which has been one of the principal factors involved in the difficulty encountered in properly assembling sheet metal blades to their supporting shrouds. As will be seen, these problems are surmounted by the present invention.

Inasmuch as the pump and turbine of the torque converter shown are generally similar in construction and design with the exception of the specific blade contour, only the construction of the turbine will be described in detail. As best seen in Figure 1, the turbine 12 comprises a hub or adapter ring 21, an outer shroud 22, an inner shroud 23, and a series of circumferentially spaced blades 24 assembled between the inner and outer shrouds. The outer shroud 22 is an annular dished sheet metal member welded or brazed adjacent its inner edge to the adapter ring 21. The inner surface of adapter ring is recessed at 26 to receive the outer shroud and forms a smooth continuation thereof to eliminate obstacles which might interfere with the smooth flow of fluid in the circuit.

Referring now to Figure 2 as well as to Figure 1, it will be noted that the outer shroud is formed with a plurality of slots 27, there being three slots for each blade 24. Correspondingly, each blade 24 has three tabs 28 projecting from its outer edge and adapted to be received within the slots 27 in the outer shroud. An important feature of the invention is the particular formation of the cooperating slots and tabs so as to facilitate the assembly of the blades to the shrouds and to provide a strong rigid structure.

Each set of three slots 27 is formed by a separate stamping operation in which the punch is moved in a radial plane at a predetermined angle to the axis of the turbine. In the present instance the angle selected is 45°. Following the punching of one set of three slots in the outer shroud, the shroud or the punch is indexed angularly and succeeding sets of slots are punched for each of the blades in the assembly. It will thus be seen that although the slots are spaced radially, axially and circumferentially of each other, their sides are parallel with each other, having been punched at one time and in a predetermined direction. For co-operation with the slots 27, the tabs 28 formed upon the outer edge of each blade are so formed that their edges are parallel to each other and, when assembled with the outer shroud, extend in the same direction as the edges of the slots. To assemble a blade to the outer shroud, it is then only necessary to move the blade toward the shroud in a radial plane at the predetermined angle to the axis of the turbine (45°), and each of the three tabs on the blade will slip easily into the corresponding slot in the shroud.

The assembly is completed by the inner shroud 23, which is provided with a single slot 29 for each blade for receiving the single tab 31 formed upon the edge of the blade. The tabs 31 are so formed as to project in an axial direction, and the slots in the shroud are similarly punched in an axial direction, so that after all of the blades have been initially assembled with the outer shroud it is only necessary to slip the inner shroud over the tabs 31.

It is possible with this arrangement to hold the limits of the slots and the tabs within close tolerances so that when assembled there will be a minimum of clearance therebetween. This enables a successful brazing job to be performed. One method of brazing the assembly together is to copper plate the blades prior to assembly and to then insert the assembly into a hydrogen furnace. Because of the close fit between the tabs and the slots, and inasmuch as the edges of each blade are accurately located with respect to the adjacent surfaces of the shrouds and thus fit closely adjacent thereto, the copper will flow into the joints and form a rigid unitary assembly with small, smooth fillets between the shroud and the blades.

Also important are the location and number of tabs provided upon each edge of the blade. It is obvious that the number of tabs and slots should be held to a minimum, consistent with adequate strength and rigidity of the assembly, in order to simplify the fabrication and assembly of the unit. The centrifugal force of the fluid in its toroidal path in the torque converter places the greatest strain at the intersection between the blade and the outer shroud. It has therefore been found that while several tabs are advisable along the outer edge of each blade, a single tab at the inner edge of each blade is sufficient to secure the latter to the inner shroud. Along the outer edge of the blade one tab is provided adjacent each end thereof, and a third tab is located intermediate the end tabs. The intermediate tab is located in the zone of the maximum flow deviation, since it is at this point that the reaction due to the change of direction of the fluid flow is the greatest. One method of locating this point is to bisect the angle formed between the direction of flow at the entrance of the blade and the direction of flow at the exit of the blade. From the foregoing, it will be apparent that there is provided a construction having a maximum of strength and rigidity with a maximum of simplicity for ease of fabrication and assembly.

Attention is now briefly directed to the construction of the reaction member 13. The reaction member 13 comprises a splined sleeve 32, an outer shroud 33, an inner shroud 34 and a series of reaction blades 36 arranged in circumferentially spaced relationship between the inner and outer shrouds. The outer shroud 33 is a sheet metal annulus slightly curved in cross section and is mounted upon and brazed to the outer periphery of the sleeve 32. At one end a ring 37 spaces the shroud 33 from the sleeve 32, while at the opposite edge the sleeve is contoured to fit the curvature of the shroud. The inner shroud 34 is likewise in the form of an annulus. A series of three slots 38 are punched in the outer shroud 33 for each blade, and cooperating tabs 39 are formed upon the adjacent edge of each blade for insertion into the slots. As before, each set of three slots is punched at one time into the outer shroud in a predetermined direction, the angle of the direction of movement of the punch being selected for maximum ease of assembly of the blades to the shroud. Likewise, at the opposite edge of each blade adjacent the inner shroud, a single tab 41 is provided for insertion into the slot 42 formed in the inner shroud.

Reference is now made to the modification shown in Figures 4 to 7 inclusive, in which the pump unit only of a modified torque converter construction is shown. It will be understood that the turbine and reaction members are designed on similar principles. The reference character 51 indicates a sheet metal annular outer shroud 51 which is mounted upon an adapter ring 52. An inner sheet metal shroud 53 is provided, and a plurality of individual sheet metal blades 54 are mounted between the inner and outer shrouds. As best seen in Figure 6, each blade 54 comprises a vane section 56, an outer flange 57 and an inner flange 58. The free edges of the outer and inner flanges 57 and 58, respectively, are arranged in abutting relationship with the vane sections 56 of the adjacent blades, so that the outer and inner flanges together with the vane sections form the walls of the fluid passages.

Referring again to Figure 4, it will be seen that in cross section the inner and outer shrouds 53 and 51 respectively, correspond generally in contour to the shape of the inner and outer flanges 58 and 57, respectively, of the blades. The shrouds, however, are recessed intermediate their radially inner and outer edges so as to provide clearance spaces between the shrouds and the adjacent flanges of the blades. This insures a good fit between the blade flanges and the shrouds, since it is only necessary that the blade flanges accurately contact the shrouds adjacent the radially inner and outer edges thereof. Thus, a certain amount of manufacturing irregularities, warpage, etc., can be present without interfering with the quality and strength of the final assembly, since with the clearance between the intermediate portions of the flanges and shrouds the end portions can be readily brought into engagement and securely spot-welded together to form satisfactory joints. It is therefore not essential to maintain the high standards of accuracy which would be necessary if the blade flanges and shrouds were required to fit along their entire surface areas. The number of parts scrapped during production is thus greatly reduced, and in addition considerable time is saved during the assembly of each torque converter element.

Referring now to Figure 4, it will be seen that, in general, the ends of the inner and outer flanges of the blades are extended beyond the vane sections thereof. For example, the outer end 59 of each outer flange 57 extends beyond the end of the vane section 56, and is bent upwardly around the end of the adjacent outer shroud 51 to present a smooth contoured surface to the fluid flow to prevent the fluid turbulence which would otherwise be present if the edge of the flange were exposed in the path of the circulating fluid. In addition, the inner end 61 of the outer flange 57 continues radially inwardly beyond the inner end of the vane section 56 and is curved around and fits against the surface of the adapter ring 52. Thus, exposed edges are again eliminated. In similar fashion, the outer and inner ends of the inner flange 58 of each blade are respectively curved around the adjacent outer edge of the inner shroud and continued along the adjacent inner edge of the inner shroud to completely cover the latter and to provide for smooth and efficient fluid flow.

Figures 8 and 9 show alternate forms of blades suitable for use with the modification generally shown in Figure 4. The U-shaped section shown in Figure 8 differs from that shown in Figure 6 in that the outer and inner flanges 66 and 67 of the blades are turned in the same direction. The free edges of the flanges are adapted to seat against the web 68 of the adjacent blade to form therewith a fluid conduit. In Figure 9 an inverted U-section blade is provided with an outer flange 71 spot-welded to the outer shroud 72 and with short inner flanges 73 abutting each other to form closed fluid conduits and spot-welded to the inner shroud 74.

In the constructions shown in Figures 4 to 9 inclusive, the blade sections are very strong and in addition are supported by the inner and outer shrouds, and consequently the thickness of the material used in the blades can be materially reduced. This will reduce the frontal areas of the edges of the vaned sections opposing the fluid flow and will reduce turbulence and fluid losses. In addition, the reduction in the thickness of the material reduces the weight of the blade and makes it easier to draw, form, assemble and weld the blades.

The modification shown in Figure 10 illustrates a blade 81 formed with tabs 82 of double thickness. These tabs are similar to those shown in Figures 1 to 3 inclusive, but are made longer and are then doubled to provide greater thickness. This permits a wider slot to be punched in the shroud and increases the life of the punch since the wider punch is not as apt to break as the thinner one. In addition, the rounded end of the double tab facilitates the insertion of the tab through the slot by automatically centering the tab in alignment with the slot. The assembly is completed by brazing, as before.

It will also be understood that the invention is not to be limited to the exact construction shown and described, but that various changes and modifications may be made without departing from the spirit and scope of the invention, as defined in the appended claims.

What is claimed is:

1. A vaned wheel for a hydraulic torque transmitting device comprising a supporting shroud and a plurality of angularly spaced three dimensionally contoured vanes assembled on said shroud, each of said vanes having a plurality of tabs projecting from one edge of the vane with all of said tabs extending in the same direction, and said shroud having openings formed therein for receiving said tabs.

2. A vaned wheel for a hydraulic torque transmitting device comprising a supporting shroud and a plurality of angularly spaced vanes assembled on said shroud, each of said vanes having a plurality of tabs projecting from one edge of the vane with all of said tabs extending in the same direction and at an acute angle to the axis of rotation of said vaned wheel, and said shroud having openings formed therein for receiving said tabs.

3. A vaned wheel for a hydraulic torque transmitting device comprising a supporting shroud formed with a plurality of slots therein, and a plurality of angularly spaced vanes assembled on said shroud having tabs projecting into said slots, the median line of said tabs and said slots being parallel to each other and at an acute angle to the axis of rotation of said vaned wheel.

4. A vaned wheel for a hydraulic torque transmitting device comprising a supporting shroud having a plurality of rectangular slots punched therein, the lines of intersection between the four internal side walls of each of said slots being parallel with each other and with the corresponding lines of intersection in the other slots and extending in a common direction at an acute angle to the axis of said shroud, and a series of vanes having projecting tabs fitting into said slots.

5. A vaned wheel for a hydraulic torque transmitting device comprising an outer annular shroud and a series of angularly spaced blades assembled on said shroud, each of said blades having three tabs projecting from its outer edge with one of said tabs being located near each end of the blade and the third tab being located in the zone of maximum curvature of said blade to support the latter against the torque reaction of the circulating fluid, each of the three tabs upon a blade extending in the same direction at an acute angle to the axis of rotation of said vaned wheel to facilitate the assembly of said blade to said wheel.

JOHN F. SWIFT.

REFERENCES CITED

The following references are of record in the file of this patent:

UNITED STATES PATENTS

| Number | Name | Date |
|---|---|---|
| 1,032,287 | Kreher | July 9, 1912 |
| 1,484,579 | Still | Feb. 19, 1924 |
| 1,877,347 | McMurdie | Sept. 13, 1932 |
| 2,031,521 | Baumann, et al. | Feb. 18, 1936 |
| 2,115,895 | Weihmann | May 3, 1938 |
| 2,155,611 | Meyerhoefer | Apr. 25, 1939 |
| 2,245,759 | Chrisman | June 17, 1941 |
| 2,256,988 | Michailoff | Sept. 23, 1941 |
| 2,324,011 | Miller | July 13, 1943 |
| 2,336,231 | Dodge | Dec. 7, 1943 |
| 2,481,541 | Schneider | Sept. 13, 1949 |
| 2,493,240 | Emmert | Jan. 3, 1950 |

FOREIGN PATENTS

| Number | Country | Date |
|---|---|---|
| 407,633 | Great Britain | Mar. 22, 1934 |
| 279,796 | Italy | Nov. 21, 1930 |